US008808657B2

(12) United States Patent
Galembeck et al.

(10) Patent No.: US 8,808,657 B2
(45) Date of Patent: *Aug. 19, 2014

(54) PREPARATION OF ALUMINUM PHOSPHATE OR POLYPHOSPHATE PARTICLES

(75) Inventors: Fernando Galembeck, Campinas (BR); João de Brito, Cajati (BR); Ádamo César Mastrângelo Amaro dos Santos, Ribeirão Preto (BR); Renato Rosseto, Araraquara (BR)

(73) Assignee: Bunge Amorphic Solutions LLC, White Plains, NY (US)

( * ) Notice: Subject to any disclaimer, the term of this patent is extended or adjusted under 35 U.S.C. 154(b) by 131 days.

This patent is subject to a terminal disclaimer.

(21) Appl. No.: 13/149,859

(22) Filed: May 31, 2011

(65) Prior Publication Data

US 2011/0301272 A1 Dec. 8, 2011

Related U.S. Application Data

(63) Continuation of application No. 11/891,510, filed on Aug. 10, 2007, now Pat. No. 7,951,309.

(60) Provisional application No. 60/837,397, filed on Aug. 11, 2006, provisional application No. 60/903,237, filed on Feb. 22, 2007.

(51) Int. Cl.
*C01B 25/12* (2006.01)
*C01B 25/36* (2006.01)

(52) U.S. Cl.
USPC .......... 423/305; 423/122; 423/316; 423/626; 423/629

(58) Field of Classification Search
USPC .......................... 423/122, 305, 626, 629, 316
See application file for complete search history.

(56) References Cited

U.S. PATENT DOCUMENTS

| | | | |
|---|---|---|---|
| 1,654,404 A | 12/1927 | Blumenberg, Jr. | |
| 2,222,199 A | 11/1940 | Fleck | |
| 3,394,987 A | 7/1968 | Lee et al. | |
| 3,650,683 A | 3/1972 | Hloch et al. | |
| 3,726,961 A | 4/1973 | Blanch et al. | |
| 3,726,962 A | 4/1973 | Vanstrom et al. | |
| 3,801,704 A | 4/1974 | Kobayashi et al. | |
| 3,879,310 A * | 4/1975 | Rigge et al. | 502/208 |
| 3,926,905 A | 12/1975 | Nose et al. | |
| 3,943,231 A | 3/1976 | Wasel-Nielen et al. | |
| 4,076,221 A | 2/1978 | Groger | |
| 4,078,028 A | 3/1978 | Kishi | |
| 4,098,749 A | 7/1978 | Hoshino et al. | |
| 4,111,884 A | 9/1978 | Takase et al. | |
| 4,122,231 A | 10/1978 | Kishi | |
| 4,138,261 A | 2/1979 | Adrian et al. | |
| 4,147,758 A | 4/1979 | Adrian et al. | |
| 4,169,802 A | 10/1979 | Basile et al. | |
| 4,171,984 A | 10/1979 | Hosaka et al. | |
| 4,216,190 A | 8/1980 | Neely, Jr. | |
| 4,227,932 A | 10/1980 | Leah et al. | |
| 4,319,926 A | 3/1982 | Nowakowski et al. | |
| 4,321,244 A | 3/1982 | Magnier et al. | |
| 4,328,033 A | 5/1982 | Boberski et al. | |
| 4,329,327 A | 5/1982 | Neely, Jr. et al. | |
| 4,333,914 A | 6/1982 | Neely, Jr. et al. | |
| 4,364,854 A | 12/1982 | McDaniel et al. | |
| 4,364,855 A | 12/1982 | McDaniel et al. | |
| 4,375,496 A | 3/1983 | Nowakowski et al. | |
| 4,383,866 A | 5/1983 | Nowakowski et al. | |
| 4,395,387 A | 7/1983 | Goltz et al. | |
| 4,418,048 A | 11/1983 | Dyer et al. | |
| 4,435,219 A | 3/1984 | Greigger | |
| 4,444,962 A | 4/1984 | McDaniel et al. | |
| 4,444,965 A | 4/1984 | McDaniels et al. | |
| 4,482,380 A | 11/1984 | Schlegel | |
| 4,487,862 A | 12/1984 | Maruya | |
| 4,505,954 A | 3/1985 | Hokamura et al. | |
| 4,518,513 A | 5/1985 | Lochner et al. | |
| 4,542,001 A | 9/1985 | Iino et al. | |
| 4,547,479 A | 10/1985 | Johnson et al. | |
| 4,597,796 A | 7/1986 | Ernst et al. | |
| 4,622,371 A | 11/1986 | McDaniel | |
| 4,640,964 A | 2/1987 | Johnson et al. | |

(Continued)

FOREIGN PATENT DOCUMENTS

BR 199104581 A 4/1993
BR 199500522 A 5/1995

(Continued)

OTHER PUBLICATIONS

Beppu et al., Self-Opacifying aluminum phosphate particles for paint film pigmentation, J. of Coatings Technology, vol. 69, No. 867, pp. 81-88, Apr. 1997.*
Beppu, M.M., Lima, E.C.O., and Galembeck, F., Aluminum Phosphate Particles Containing Closed Pores: Preparation, Characterization, and Use as a White Pigment, Journal of Colloid and Interface Science 178, 93-103 (1996), Article No. 0097.
Beppu, M.M., Lima, E.C.O., Sassaki, R.M., and Galembeck, F., Self-Opacifying Aluminum Phosphate Particles for Paint Film Pegmentation, Journal of Coatings Technology, vol. 69, No. 867, 81-88, Apr. 1997.
Lima, E.C.O., Beppu, M.M., and Galembeck, F., Filho, J.F.V., and Soares, D.M., Non-Crystalline Aluminum Polyphosphates: Preparation and Properties, J. Braz. Chem. Soc., vol. 7, No. 3, pp. 209-215, 1996, printed in Brazil.
Souza, E.F., and Galembeck, F., Formation of Opaque Films by Biomimetic Process, Journal of Material Science 32 (1997) 2207-2213.
Souza, E.F., Silva, M.D.C., and Galembeck, F., Improved Latex Film—Glass Adhesion Under Wet Environments by Using and Aluminum Polyphosphate Filler, [publication], 358-377 (1998).
Lima, E.C.O., Beppu, M.M., and Galembeck, F., Nanosized Particles of Aluminum Polyphosphate, Langmuir, vol. 12, No. 7, 1701-1703.

(Continued)

*Primary Examiner* — Holly Le
(74) *Attorney, Agent, or Firm* — Snell & Wilmer L.L.P.

(57) ABSTRACT

A process for the preparation of amorphous aluminum phosphate or polyphosphate-based pigment by reacting aluminum phosphate and sodium aluminate is provided. The amorphous aluminum phosphate or polyphosphate is characterized by a skeletal density of less than 2.50 grams per cubic centimeter and a phosphorus to aluminum mole ratio of greater than 0.8. In one embodiment, the composition is useful in paints as a substitute for titanium dioxide.

11 Claims, No Drawings

(56) References Cited

U.S. PATENT DOCUMENTS

| | | | |
|---|---|---|---|
| 4,673,663 A | 6/1987 | Magnier | |
| 4,717,701 A | 1/1988 | McDaniel | |
| 4,746,568 A | 5/1988 | Matsumoto et al. | |
| 4,758,281 A | 7/1988 | Eckler et al. | |
| 4,767,802 A | 8/1988 | Sakakibara et al. | |
| 4,782,109 A | 11/1988 | DuLaney et al. | |
| 4,876,097 A | 10/1989 | Autant et al. | |
| 4,888,056 A | 12/1989 | van der Kolk et al. | |
| 4,898,660 A | 2/1990 | Wilson et al. | |
| 4,972,002 A | 11/1990 | Volkert | |
| 4,990,217 A | 2/1991 | Philippot et al. | |
| 4,996,103 A | 2/1991 | Henn et al. | |
| 5,028,684 A | 7/1991 | Neuhaus et al. | |
| 5,077,332 A | 12/1991 | Blattler et al. | |
| 5,096,933 A | 3/1992 | Volkert | |
| 5,108,755 A | 4/1992 | Daniels et al. | |
| 5,183,656 A | 2/1993 | Uesaka et al. | |
| 5,208,271 A | 5/1993 | Gallagher | |
| 5,242,744 A | 9/1993 | Schryer | |
| 5,256,253 A | 10/1993 | Zidovec et al. | |
| 5,296,027 A | 3/1994 | Ernst et al. | |
| 5,374,411 A | 12/1994 | Davis et al. | |
| 5,403,519 A | 4/1995 | Rittler | |
| 5,427,821 A * | 6/1995 | Hegedus et al. | 427/385.5 |
| 5,486,232 A | 1/1996 | Griffith et al. | |
| 5,488,016 A | 1/1996 | Rittler | |
| 5,496,529 A * | 3/1996 | Fogel et al. | 423/305 |
| 5,534,130 A | 7/1996 | Sekhar | |
| 5,552,361 A | 9/1996 | Rieser et al. | |
| 5,698,758 A | 12/1997 | Rieser et al. | |
| 5,707,442 A | 1/1998 | Fogel et al. | |
| 5,763,015 A | 6/1998 | Hasui et al. | |
| 5,783,510 A | 7/1998 | Kida et al. | |
| 5,869,587 A * | 2/1999 | Auburn et al. | 526/233 |
| 5,883,200 A | 3/1999 | Tsuchiya et al. | |
| 6,010,563 A | 1/2000 | Taketani et al. | |
| 6,022,513 A | 2/2000 | Pecoraro et al. | |
| 6,117,373 A | 9/2000 | Kida et al. | |
| 6,139,616 A | 10/2000 | Nagayama et al. | |
| 6,177,489 B1 | 1/2001 | Okuse et al. | |
| 6,316,532 B1 | 11/2001 | Nozaki et al. | |
| 6,342,546 B1 | 1/2002 | Kato et al. | |
| 6,409,951 B1 | 6/2002 | Inoue et al. | |
| 6,503,304 B2 | 1/2003 | Korn et al. | |
| 6,547,870 B1 | 4/2003 | Griessmann et al. | |
| 6,562,474 B1 | 5/2003 | Yoshimi et al. | |
| 6,589,324 B2 | 7/2003 | Kamo et al. | |
| 6,635,192 B1 | 10/2003 | Schwarz | |
| 6,646,058 B1 | 11/2003 | Koger | |
| 6,669,816 B1 | 12/2003 | Poch et al. | |
| 6,677,053 B2 | 1/2004 | Yamaji et al. | |
| 6,784,236 B2 | 8/2004 | Sugita et al. | |
| 6,838,506 B2 | 1/2005 | Nakao et al. | |
| 6,881,782 B2 | 4/2005 | Crater et al. | |
| 7,951,309 B2 * | 5/2011 | Galembeck et al. | 252/363.5 |
| 2001/0031316 A1 | 10/2001 | Nozaki et al. | |
| 2002/0031679 A1 | 3/2002 | Yano et al. | |
| 2002/0040557 A1 | 4/2002 | Felton | |
| 2002/0158230 A1 | 10/2002 | Bortnik | |
| 2003/0113486 A1 | 6/2003 | Sakai et al. | |
| 2004/0063815 A1 | 4/2004 | Kinose et al. | |
| 2004/0071887 A1 | 4/2004 | Newton | |
| 2004/0092637 A1 | 5/2004 | McClanahan | |
| 2004/0261909 A1 | 12/2004 | Hamada | |
| 2005/0249883 A1 * | 11/2005 | Buettner et al. | 427/405 |
| 2006/0045831 A1 | 3/2006 | Galembeck et al. | |
| 2006/0211798 A1 | 9/2006 | Galembeck et al. | |
| 2007/0215005 A1 | 9/2007 | Nicolai et al. | |
| 2008/0038556 A1 * | 2/2008 | Galembeck et al. | 428/402 |

FOREIGN PATENT DOCUMENTS

| | | | |
|---|---|---|---|
| BR | 199400746 A | 10/1995 | |
| EP | 0492137 A2 | 7/1992 | |
| EP | 598464 A1 | 5/1994 | |
| EP | 0753546 A2 | 1/1997 | |
| EP | 0837031 A2 | 4/1998 | |
| EP | 1241131 A1 | 9/2002 | |
| EP | 1878700 A1 | 1/2008 | |
| FR | 2157866 A1 | 6/1973 | |
| GB | 0517258 A | 1/1940 | |
| GB | 1379562 A | 1/1975 | |
| GB | 1403242 A | 8/1975 | |
| GB | 2038791 A | 7/1980 | |
| GB | 2042573 A | 9/1980 | |
| JP | 53019345 A | 2/1978 | |
| JP | 53059725 A | 5/1978 | |
| JP | 55160059 A | 12/1980 | |
| JP | 56032553 A | 4/1981 | |
| JP | 56032554 A | 4/1981 | |
| JP | 56032555 A | 4/1981 | |
| JP | 56032556 A | 4/1981 | |
| JP | 56131671 A | 10/1981 | |
| JP | 57158267 A | 9/1982 | |
| JP | 60215091 A | 10/1985 | |
| JP | 61101566 A | 5/1986 | |
| JP | 61286209 A | 12/1986 | |
| JP | 62004753 A | 1/1987 | |
| JP | 63101454 A | 5/1988 | |
| JP | 1110567 A | 4/1989 | |
| JP | 1167381 A | 7/1989 | |
| JP | 1213374 A | 8/1989 | |
| JP | 1234475 A | 9/1989 | |
| JP | 1249683 A | 10/1989 | |
| JP | 4090874 A2 | 3/1992 | |
| JP | 6179866 A | 6/1994 | |
| JP | 6286054 A | 10/1994 | |
| JP | 7241954 A | 9/1995 | |
| JP | 7330451 A | 12/1995 | |
| JP | 8072197 A | 3/1996 | |
| JP | 8268704 A | 10/1996 | |
| JP | 8283619 A | 10/1996 | |
| JP | 10139923 A | 5/1998 | |
| JP | 10235782 A | 9/1998 | |
| JP | 11047261 A | 2/1999 | |
| JP | 2001089127 A | 4/2001 | |
| JP | 2001329221 A | 11/2001 | |
| WO | WO-2006024959 A2 | 3/2006 | |
| WO | WO-2007104465 A2 | 9/2007 | |

OTHER PUBLICATIONS

Monteiro, V.A.R. Souza, E.F., Azevedo, M.M.M, and Galembeck, F., Aluminum Polyphosphate Nanoparticles: Preparation, Particle Size Determination, and Microchemistry, Journal of Colloid and Interface Sceince 217, 237-248 (1999), Article ID jcis. 1999, 6381, http://www.idealibrary.com.

Burrell, L.S., Johnston, C.T., Schulze, D. Klein, J. White, J.L. and Hem. S.L., Aluminum Phosphate Adjuvants Prepared by Precipitation of Constant pH. Part 1: Composition and Structure, Vaccine 19 (2001) 275-281.

Burrell, L.S., Johnston, C.T., Schulze, D. Klein, J. White, J.L. and Hem. S.L., Aluminum Phosphate Adjuvants Prepared by Precipitation of Constant p.H. Part II: Physicochemical Properties, Vaccine 19 (2001) 282-287.

Yang, H., Walton, R.I., Biedasek, S., Antonijevic, S., and Wimperis, S., Experimental Observations of Water—Framework Interactions in a Hydrated Microporous Aluminum Phosphate, J. Phys. Chem. B. 2005, 109, 4464-4469.

Filho, P.P.A., and Galembeck, F., Genesis of a Solid Foam: Iron (III) Metaphosphate Transformation in Sol-Gel Crystallization Processes, Langmuir 1990, 6, 1013-1016.

Lima, E.C.O., and Galembeck, F., Particles of Aluminum Metaphosphate Containing Closed Pores. Preparation, Characterization and Optical Properties, Colloids and Surfaces A: Physicochemical and Engineering Aspects, 75 (1993) 65-74.

International Search Result completed Feb. 17, 2006; and Written Opinion.

WPI Database Search Results, Derwent Publications Ltd., London, GB.

Faison et al.; Use of Polyphosphates as Deflocculants of Alumina; Ceramic Engineering & Science Proceedings; vol. 12[1-2]; 1991; pp. 106-115.

(56) References Cited

OTHER PUBLICATIONS

Rosseto et al.; Hydrous Non-Crystalline Phosphates: Structure, Function and a New White Pigment; J. Braz. Chem. Soc.; vol. 17, No. 8; Jun. 2006; pp. 1465-1472; XP002432072; ISSN: 0103-5053.
International Serach Report and Written Opinion of corresponding International Application No. PCT/BR2007/000204 dated Dec. 12, 2007; total 11 pages.
International Preliminary Examination Report of corresponding International Application No. PCT/BR2007/000204 dated Dec. 10, 2008; total 14 pages.
Correspondence dated Feb. 13, 2014 from Foreign Associate Dannemann Siemsen Bigler & Ipanema Moreira reporting informal English version of unfavorable opinion regarding Brazilian Patent Application No. PI0715813-0, 9 pages.

* cited by examiner

PREPARATION OF ALUMINUM PHOSPHATE OR POLYPHOSPHATE PARTICLES

PRIOR RELATED APPLICATIONS

This application is a continuation of Ser. No. 11/891,510 filed Aug. 10, 2007, now U.S. Pat. No. 7,951,309, which claims priority to U.S. Provisional Application No. 60/837,397 filed on Aug. 11, 2006, and to U.S. Provisional Application No. 60/903,237 filed on Feb. 22, 2007, which applications are specifically incorporated herein, in their entirety, by reference.

FIELD OF THE INVENTION

Provided herein are processes for making compositions comprising aluminum phosphate, aluminum orthophosphate or aluminum polyphosphate that comprise hollow particles. Further provided are uses of such particles as pigments in paints. Also provided are aluminum phosphate, aluminum orthophosphate and aluminum polyphosphate compositions in form of a slurry. In certain embodiments, the aluminum phosphate, aluminum orthophosphate or aluminum polyphosphate further comprise an ion, such as sodium, potassium or lithium ion.

BACKGROUND OF INVENTION

Titanium dioxide is the most common white pigment due to its strong ability to backscatter visible light, which is in turn dependent on its refractive index. Substitutes for titanium dioxide have been sought, but the refractive indexes of both the anatase and rutile forms of this oxide are much higher than those of any other white powder, due to structural reasons.

Titanium dioxide pigments are insoluble in coating vehicles in which they are dispersed. The performance properties of such titanium dioxide pigments, including its physical and chemical characteristics, are determined by the particle size of the pigment and the chemical composition of its surface. Titanium dioxide is commercially available in two crystal structures: anatase and rutile. Rutile titanium dioxide pigments are preferred as they scatter light more efficiently and are more stable and durable than anatase pigments. Titanium scatters light strongly due to its high refractive index, that is markedly different from that of most resins or paint components. The decorative and functional abilities of titanium dioxide are due to its scattering power that make it a highly desirable pigment. However, titanium dioxide is known to be an expensive pigment to manufacture. Accordingly, there is a need for a more affordable substitute for titanium dioxide as a pigment. There is also a need for methods for cost effective manufacturing of the aluminum phosphate with hollow particles.

SUMMARY OF THE INVENTION

Provided herein is a process for making an amorphous aluminum phosphate or polyphosphate. In certain embodiments, the amorphous aluminum phosphate or polyphosphate further comprises an ion, such as sodium, potassium or lithium ion. In one embodiment, the process comprises reacting phosphoric acid and aluminum hydroxide to yield an acidic aluminum phosphate solution or suspension. The process may further comprise a step of neutralizing. The neutralizing step can be carried out by sodium aluminate.

In certain embodiments, the process for making an amorphous aluminum phosphate or polyphosphate comprises reacting phosphoric acid, aluminum hydroxide and sodium aluminate.

In one embodiment, the process for making an amorphous aluminum phosphate or polyphosphate comprises reacting an acidic aluminum phosphate solution and sodium aluminate.

In one embodiment, the reaction comprises two steps. In the first step, phosphoric acid reacts with aluminum hydroxide to produce acidic aluminum phosphate solution. In one embodiment, the aluminum phosphate is produced as a water soluble aluminum phosphate. In certain embodiments, the pH of water soluble aluminum phosphate is less than about 3.5. In certain embodiments, the pH is about 3, 2.5, 2, 1.5 or 1. In certain embodiments, the aluminum phosphate is produced as a fine solid-liquid dispersion at a higher pH. In one embodiment, the pH is about 3, 4, 5 or 6.

In a second step, the acidic aluminum phosphate aqueous solution or dispersion from the first chemical step is reacted with sodium aluminate. In certain embodiments, the sodium aluminate is used as a water solution at a pH greater than about 10. In one embodiment, the pH of the sodium aluminate water solution is greater than about 11, 12 or 13. In one embodiment, the pH of the sodium aluminate water solution is greater than about 12. In one embodiment, aluminum phosphate is generated as a solid precipitate. In one embodiment, sodium aluminum phosphate is generated as a solid precipitate. In one embodiment, the solid aluminum-sodium phosphate has a molar ratio P/Al=0.85 and a molar ratio Na/Al=0.50. In one embodiment, the solid aluminum-sodium phosphate has a molar ratio P/Al=1.0 and a molar ratio Na/Al=0.76. In certain embodiments, the molecules with other formulation ratios can be obtained by the same procedure.

In one embodiment, the solid hydrated aluminum hydroxide is added to the phosphoric acid in the first chemical step. In another embodiment, the solid hydrated aluminum hydroxide is added to the purified liquid sodium aluminate solution to form a colloidal solution or true solution. In another embodiment, the solid hydrated aluminum hydroxide is added directly as solid or solid-liquid suspension in water in the second reaction step. In certain embodiments, the reaction is carried out in a single step.

In certain embodiments, the reactor to perform the second step of the reaction, i.e., reaction of an acidic aqueous aluminum phosphate solution or dispersion from the first chemical step with sodium aluminate, has a very high mixing and shear stress performance to mix the reactants and to generate a solid precipitate with the desired particle size distribution. In certain embodiments, the reactor dispersion properties could be adjusted for the spray drying process requirements.

In certain embodiments, the amorphous aluminum phosphate or polyphosphate further comprises an ion, such as sodium, potassium or lithium ion. In one embodiment, the amorphous aluminum phosphate or polyphosphate further comprises sodium. In certain embodiments, the amorphous aluminum phosphate or polyphosphate is characterized by a skeletal density of between 1.95 and 2.50 grams per cubic centimeter. In certain embodiments, amorphous aluminum phosphate or polyphosphate has a phosphorus to aluminum mole ratio of greater than 0.8 or 1.3. The aluminum phosphate or polyphosphate may be in a slurry form. In one embodiment, the aluminum phosphate or polyphosphate is in a powder form and, for example, has one to four voids per particle of amorphous aluminum phosphate or polyphosphate powder. The powder form of the product may comprise an average individual particle radius size of between 10 and 40 nanometers.

The aluminum phosphate or polyphosphate may be used as an ingredient in a paint, and preferably, as a substitute (in part or in whole) for titanium dioxide. The product may also be used as an ingredient in a varnish, printing ink, or plastic. The aluminum phosphate or polyphosphate may be dried at temperatures below 130° C., and even at room temperature, to produce a powder that contains 10-20 water weight percent.

In one embodiment, the process of making the amorphous aluminum phosphate or polyphosphate generally comprises the following steps: combining phosphoric acid and aluminum hydroxide followed by neutralization with sodium aluminate. In certain embodiments, the process further comprises filtrating and washing the product from a suspension into a cake. The washed cake may be further dispersed in solvent. In one embodiment, the process involves drying of the cake. In further embodiments, the dry product is polymerized. In another embodiment, the process comprises the step of micronization of the product.

DESCRIPTION OF EMBODIMENTS OF THE INVENTION

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Provided herein is an aluminum phosphate composition comprising aluminum phosphate, aluminum polyphosphate, aluminum metaphosphate, or a mixture thereof The terms "aluminum phosphate" and "aluminum phosphate composition," as used herein, are meant to include both aluminum phosphate as well as aluminum polyphosphate, aluminum metaphosphate, and mixtures thereof. The term "void" referred to herein is generally synonymous with the term "hollow particle," and is also described herein as a "closed void." The void (or closed void or hollow particle) is part of a core and shell structure of the aluminum phosphate mixture. The voids may be observed and/or characterized using either transmission or scanning electron microscopes ("TEMs" or "SEMs"). The use of TEMs or SEMs are well known to those of skill in the art. Generally, optical microscopy is limited, by the wavelength of light, to resolutions in the range of a hundred, and usually hundreds, of nanometers. TEMs and SEMs do not have this limitation and are able to attain a considerably higher resolution, in the range of a few nanometers. An optical microscope uses optical lenses to focus light waves by bending them, while an electron microscope uses electromagnetic lenses to focus beams of electrons by bending them. Beams of electrons provide great advantages over beams of light both in control of magnification levels and in the clarity of the image that can be produced. Scanning electron microscopes complement transmission electron microscopes in that they provide a tool to obtain the three dimensional image of the surface of a sample.

Amorphous (i.e., non-crystalline) solids exhibit differences from their crystalline counterparts with a similar composition, and such differences may yield beneficial properties. For example, such differences may include one or more of the following: (i) the non-crystalline solids do not diffract x-rays at sharply defined angles but may produce a broad scattering halo instead; (ii) the non-crystalline solids do not have well defined stoichiometry, thus they can cover a broad range of chemical compositions; (iii) the variability of chemical composition includes the possibility of incorporation of ionic constituents other than aluminum and phosphate ions; (iv) as amorphous solids are thermodynamically meta-stable, they may demonstrate a tendency to undergo spontaneous morphological, chemical and structural changes; and (v) the chemical composition of crystalline particle surface is highly uniform while the chemical composition of surface of amorphous particles may show large or small differences, either abrupt or gradual. In addition, while particles of crystalline solids tend to grow by the well-known mechanism of Ostwald ripening, non-crystalline particles may expand or swell and shrink (de-swell) by water sorption and desorption, forming a gel-like or plastic material that is easily deformed when subjected to shearing, compression or capillary forces.

Process for Preparing Amorphous Aluminum Phosphate

In one aspect, provided herein is a synthetic process that produces non-crystalline aluminum phosphates with unique properties. The process is described in the following general steps. One of skill in the art will recognize that certain steps may be altered or omitted altogether. In one embodiment, the steps in the process include: preparation of the main reagents used in the process, such as solution of phosphoric acid, solid hydrated aluminum hydroxide and sodium aluminate solution; addition of the reagents in a reactor equipped with a sloshing system to keep the homogeneity of the mixture during the process; control, during the addition of the reagents in the reactor, of the temperature and pH of the mixture and the reaction time; filtration of the suspension; washing out of the impurities present in the filter cake; dispersion of the washed cake in an adequate disperser; drying of the dispersed pulp in a turbo-dryer or spray drier; micronization of the dried product to an average granulometry of 1.0 to 10 microns; and polymerization of the dried product by thermal treatment of the aluminum phosphate in a calcinator. In certain embodiments, the process comprises a step of premixing phosphoric acid and aluminum sulfate solutions before addition to the reactor. In certain embodiments, the aluminum phosphate or polyphosphate in pigments can be prepared and used as a slurry pulp (dispersion of high content of solids, which flows under the action of gravity or low pressure pumps) with 20-60% or more of non-volatiles by weight; as dried and micronized aluminum phosphate with about 10-30%, in certain embodiments, 10, 12, 15, 17, 20, 25 or 30% of humidity; and also in the polymeric form as calcinated and micronized aluminum polyphosphate.

In one embodiment, the amorphous aluminum phosphate is prepared by a reaction between phosphoric acid and aluminum hydroxide. The process may further comprise a step of neutralizing. The neutralizing step can be carried out by sodium aluminate.

In certain embodiments, the process for making an amorphous aluminum phosphate or polyphosphate comprises reacting phosphoric acid, aluminum hydroxide and sodium aluminate.

In one embodiment, the process for making an amorphous sodium phosphate or polyphosphate comprises reacting aluminum phosphate and sodium aluminate.

In one embodiment, the reaction comprises two steps. In the first step, phosphoric acid reacts with aluminum hydroxide to produce aluminum phosphate at an acidic pH. In one embodiment, the aluminum phosphate is produced as a water soluble aluminum phosphate. In certain embodiments, the pH of water soluble aluminum phosphate is less than about 3.5. In certain embodiments, the pH is about 3, 2.5, 2, 1.5 or 1. In certain embodiments, the aluminum phosphate is produced as a fine solid-liquid dispersion at a higher pH. In one embodiment, the pH is about 3, 4, 5 or 6.

In a second step, the acidic aqueous aluminum phosphate solution or dispersion from the first chemical step is reacted with a sodium aluminate. In certain embodiments, the sodium aluminate is used as an aqueous solution at a pH greater than about 10. In one embodiment, the pH of the aqueous sodium aluminate solution is about 11, 12 or 13. In one embodiment, the pH of the aqueous sodium aluminate solution is greater than about 12. The aluminum sodium phosphate is generated as a solid precipitate. In one embodiment, the solid aluminum-sodium phosphate has a molar ratio P/Al=0.85 and a molar ratio Na/Al=0.50. In one embodiment, the solid aluminum-sodium phosphate has a molar ratio P/Al=1.0 and a molar ratio Na/Al=0.76. In certain embodiments, the molecules with other formulation ratios can be obtained by the same procedure.

In one embodiment, the solid hydrated aluminum hydroxide is added to the phosphoric acid in the first chemical step. In another embodiment, the solid hydrated aluminum hydroxide is added to the purified liquid sodium aluminate solution to form a colloidal solution. In another embodiment, the solid hydrated aluminum hydroxide is added directly as solid or solid-liquid suspension in water in the second reaction step. In certain embodiments, the reaction is carried out in a single step.

In certain embodiments, the reactor to perform the second step of the reaction, i.e., reaction of an acidic aqueous aluminum phosphate solution or dispersion from the first chemical step with sodium aluminate, has a very high mixing and shear stress performance to mix the reactants and to generate a solid precipitate with the desired particle size distribution. In certain embodiments, the reactor dispersion properties could be adjusted for the spray drying process requirements.

In certain embodiments, the amorphous aluminum phosphate or polyphosphate further comprises an ion, such as sodium, potassium or lithium ion. In one embodiment, the amorphous aluminum phosphate or polyphosphate further comprises sodium. In certain embodiments, the amorphous aluminum phosphate or polyphosphate is characterized by a skeletal density of between 1.95 and 2.50 grams per cubic centimeter. In certain embodiments, the amorphous aluminum phosphate or polyphosphate is characterized by a skeletal density about 1.95, 2.00, 2.10, 2.20, 2.30, 2.40 or 2.50 grams per cubic centimeter. In certain embodiment, amorphous aluminum phosphate or polyphosphate has a phosphorus to aluminum mole ratio of greater than 0.8 to 1.3. In certain embodiment, amorphous aluminum phosphate or polyphosphate has a phosphorus to aluminum mole ratio of greater than 0.9 to 1.3. In certain embodiment, amorphous aluminum phosphate or polyphosphate has a phosphorus to aluminum mole ratio of about 0.8, 0.9, 1.0, 1.1, 1.2 or 1.3. In certain embodiment, amorphous aluminum phosphate or polyphosphate has a sodium to aluminum mole ratio of about 0.6 to 1.4. In certain embodiment, amorphous aluminum phosphate or polyphosphate has a sodium to aluminum mole ratio of 0.6, 0.7, 0.76, 0.8, 0.9, 1.0, 1.1, 1.2 or 1.3. The aluminum phosphate or polyphosphate may be in a slurry form. In one embodiment, the slurry comprises about 30%, 35%, 40%, 45%, 50%, 55% or 60% non-volatile content by weight (ASTM D280). In one embodiment, the aluminum phosphate or polyphosphate is in a powder form and, for example, has one to four voids per particle of amorphous aluminum phosphate or polyphosphate powder. The powder form of the product may comprise an average individual particle radius size of between 10 and 40 nanometers. In one aspect the powder form of the product may comprise an average individual particle radius size of between 10 and 30 or 10 and 20 nanometers.

The sodium aluminate solution for use in the process provided herein can be obtained by methods known to those of skill in the art. In one embodiment, the sodium aluminate solution is a standard chemical product resulting from the first step in the Bayer process in the alumina ($Al_2O_3$) extraction from Bauxite ore, often called "purified sodium pregnant solution". This liquid aqueous sodium aluminate solution is saturated at ambient temperature and stabilized with sodium hydroxide, NaOH. Its typical compositions are: sodium aluminate, 58 to 65% mass (25 to 28% mass of $Al_2O_3$) and sodium hydroxide, 3.5 to 5.5% mass (2.5 to 4% mass of free $Na_2O$). In certain embodiments, it has a molar ratio Na/Al from about 1.10 to 2.20 and low impurities (depending on the Bauxite origin: Fe =40 ppm, Heavy metals =20 ppm, and small amount of anions, $Cl^-$ and $SO_4^{2-}$). In certain embodiments, the sodium aluminate water solution has a molar ratio Na/Al of about 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.0, 2.05, 2.10, 2.15 or 2.2. The solution color, in certain embodiments, is amber. In certain embodiments, the viscosity of the solution is approximately 100 cP. In certain aspects, the sodium aluminate solution is purified by polishing filtration. In certain embodiments, the sodium aluminate solution is regenerated from solid aluminum hydroxide and sodium hydroxide.

The solid hydrated aluminum hydroxide is obtained by methods known to one of skill in the art. In one embodiment, aluminum hydroxide is an industrial chemical produced by the Bayer process. The solid hydrated aluminum hydroxide can be obtained from the "purified sodium aluminate pregnant solution" by precipitation which is accomplished via cooling the solution. In one embodiment, the sodium aluminate thus produced has a low level of impurities and a variable amount of humidity (cations about 70 ppm, Chlorates about 0.85% mass and Sulfates about 0.60% mass (these impurities are determined by the purification level of the "Purified Sodium Aluminate pregnant solution) and the total water, hydration and humidity, about 22.0 to 23.5% mass. In one aspect, both raw materials are standard primary industrial products, just first and second step from the Bauxite processing, (commodities) produced in huge amounts by the Bauxite processors.

In one embodiment, the chemical reaction results in the formation of aluminum sodium phosphate ($Al(OH)_{0.7}Na_{0.7}(PO_4) \cdot 1.7 H_2O$). After the formation of aluminum sodium phosphate, the suspension containing around 6.0% to 10.0% of solids, with a maximum approximate temperature of 45° C., and density in a 1.15 to 1.25 g/cm³ range, is pumped to a conventional filter press. In the filter press, the liquid phase (sometimes referred to as the "liquor") is separated from the solid phase (sometimes referred to as the "cake"). The wet cake, containing approximately 35% to 45% of solids, in certain embodiment, about 35, 40 or 45% solids, is kept in the filter for washing cycle.

In one embodiment, the washing of the wet cake is performed in the filter itself and in two to three process steps. In the first washing ("displacement washing") the largest part of the filtered substance that is contaminating the cake is removed. The washing step is performed using treated water over the cake at a flow rate of 6.0 m³ of water/ton of dried cake. A second washing step, also with treated water and with a flow of 8.0 m³ of water/ton of dried cake, may be carried out to reduce the contaminants. And, finally, a third washing step may be carried out with water to further reduce the contaminants. Finally, the cake may be blown with compressed air during a certain period of time. The wet product should present between 35% and 45% of solids.

Next, in this particular embodiment, the cake dispersion may be processed in such a way that the filter cake, wet and washed, is extracted from the press filter by a conveyor belt and transferred to a reactor/disperser.

In certain embodiments, the dispersion of the cake is aided by the addition of a dispersing agent, such as a solution of sodium polyphosphate.

In one embodiment, after the dispersion step, the product is then dried, when the aluminum phosphate "slurry," with a percentage of solids within the 30% to 50% range, is pumped to the drying unit. In another embodiment, the water removal from the material can be carried out with drying equipment, such as a "turbo dryer" type through an injection of a hot air stream, or a "spray dryer" at a temperature of 80° C. to 140° C., through the sample. The final humidity of the product should preferentially be kept in the 10% to 20% of water range.

In certain embodiments, the next step of the process includes product calcination. In this step, the orthophosphate ions of the dry aluminum phosphate undergo condensation to polyphosphate ions (diphosphate, triphosphate, tetraphosphate, n-phosphate where "n" can be any integer greater than 1, in certain embodiments, n is greater than or equal to 4). In one embodiment, n is greater than or equal to 10. In another embodiment, n is greater than or equal to 20. In one embodiment, n is less than 100. In another embodiment, n is less than 50. This process step is carried out by heating the aluminum phosphate, in a spray-drier type calcinator, in a temperature range of 500° C. to 600° C. After the polymerization, the product may be cooled quickly and sent to the micronization unit. At this point, product micronization step may be carried out. Finally, the resulting product that leaves the drier (or the calcinator) is transferred to the grinding and finishing unit, ground in a micronizer/sorter, and its granulometry kept in the 99.5% range below 400 mesh.

The aluminum phosphate or the aluminum polyphosphate, after the thermal treatment, can be applied as white pigment in the formulation of home paints, based on water, due to its self-opacification property in latex, PVA, and acrylic films, due to the formation of particles with hollow structures with high light scattering capacity, during the paint drying process.

When a dispersion of such particles dries under air at room temperature or up to 120° C., nano-sized particles are formed that have a core-and-shell structure. The nano-sized particles show a partial coalescence into micron-sized aggregates with irregular shapes. Such particles may be observed by analytical electron microscopy. Moreover, these particles contain many voids dispersed as closed pores in their interior. The cores of the particles are more plastic than the respective shells of the particles. This phenomenon is evidenced by growth of the voids upon heating, while the perimeter of the shells remains essentially unaltered.

The aluminum phosphate particles described herein demonstrate improved properties in certain aspects. For example, the aluminum phosphate particles present voids, when the particles are dried, for example, at room temperature, or up to 130° C. In one embodiment, the particles are dried between 40° C. and 130° C. In another embodiment, the particles are dried between 60° C. and 130° C. In certain embodiments, the particles are dried between 80° C. and 120° C. In addition, the aluminum phosphate particles have a core-and-shell structure. In other words, these particles have shells chemically different from their cores. This property is evidenced by several different observations. First, the energy-filtered inelastic electron images of the particles in the plasmon region (10-40 eV), as measured by a transmission electron microscope, show bright lines surrounding most particles. Nanoindentation measurements performed in the digital pulsed force microscope (DPFM show that particle surfaces are stiffer than the particle interior.

In certain embodiments, the aluminum phosphate or polyphosphate in pigments can be prepared and used as a slurry pulp (dispersion of high content of solids, which flows under the action of gravity or low pressure pumps) with 20-60% or more of non-volatiles by weight.

In certain embodiments, provided herein is a slurry comprising aluminum phosphate particles and a dispersing agent. In certain embodiments, the dispersing agent is a polyphosphate salt, such as sodium polyphosphate, a copolymer of polyether/polysiloxane or a combination thereof. In certain embodiments, the slurry comprises from about 25% up to about 70% of non-volatiles by weight measured according to ASTM D280. In certain embodiments, the slurry comprises from about 40% up to about 60% non-volatiles by weight. In certain embodiments, the slurry comprises about 20, 30, 40, 45, 50, 55, 60% or more of non-volatile solids by weight. In certain embodiments, the slurry comprises about 50% non-volatiles by weight.

In certain embodiments, the slurry comprises about 25% up to about 70% aluminum phosphate by weight. In certain embodiments, the slurry comprises about 40% up to about 60% aluminum phosphate by weight. In certain embodiments, the slurry comprises 20, 30, 40, 45, 50, 55, 60% or more of aluminum phosphate by weight. In certain embodiments, the slurry comprises about 50% aluminum phosphate by weight.

In certain embodiments, the aluminum phosphate slurry provided herein has a viscosity ranging from about 50 cPs up to about 150 cPs. In certain embodiments, the aluminum phosphate slurry provided herein has a viscosity ranging from about 55 cPs up to about 120 cPs. In certain embodiments, the aluminum phosphate slurry provided herein has a viscosity of about 50 cPs, 70 cPs, 80 cPs, 90 cPs, 100 cPs, 110 cPs or about 120 cPs.

In certain embodiments, the particle size of aluminum phosphate pigments is controlled to maximize the light scattering. In certain embodiments, particle size determination is done by static light scattering in a Cilas model 1064 instrument. In certain embodiments, the amorphous aluminum phosphate or polyphosphate is characterized by particle size distribution between about 0.1 to about 5 microns. In one embodiment, the amorphous aluminum phosphate or polyphosphate is characterized by a particle size distribution between about 0.2 to about 0.6 microns, about 0.6 to about 1.0 microns, about 1.0 to about 1.5 microns, about 1.0 to about 3.0 microns or about 1.60 to about 3.82 microns. In certain embodiments, the aluminum phosphate provided herein is micronized in a hammer mill to particle size within 3 microns (d10) and 19 microns (d90). In one embodiment, particle size for highly dilute, sonicated samples is 0.1 micron, in a dynamic light scattering instrument (Brookhaven ZetaPlus).

The aluminum phosphate particles, as prepared according to the process described herein, may be dispersed in latex in the presence of crystalline particulate solids. If a film is cast using this dispersion, highly opaque films are produced. In certain embodiments, the highly opaque films can be produced in the case of thin single layers of particles. Experimental evidence for film opacity is obtained by using amorphous aluminum phosphate as a replacement for titanium dioxide (i.e., $TiO_2$). Titanium dioxide is the current standard white pigment used by almost all manufacturers involved in latex paint formulations. A standard styrene-acrylic latex paint was prepared using a usual load of titanium dioxide and it was compared to a paint wherein fifty percent of the titanium dioxide load was replaced by amorphous aluminum phosphate. This comparison was made in two different paint-testing laboratories. The optical measurements taken from films drawn using the two paints demonstrate that aluminum phosphate may replace titanium dioxide producing films while preserving the optical properties of the film.

The aluminum phosphate described herein has relatively small particle size. Such smaller particle sizes allow the particles to distribute extensively in the film and to associate intimately with the resin, with inorganic fillers and with themselves, thereby creating clusters that are sites for extensive void formation when the paint dries. The present aluminum phosphate shows this tendency to form closed voids, or hollow particles, to an extent that has not been previously observed for aluminum phosphates, polyphosphates or any other particles. In some embodiments, the particles of aluminum phosphate or polyphosphate are substantially free of open pores while containing a number of closed pores. As a result, in such embodiments, the macropore volume is substantially less than 0.1 cc/gram.

Opacification of water-based paint films using aluminum phosphate in some embodiments involves unique features. The wet coating film is a viscous dispersion of polymer, aluminum phosphate, titanium dioxide and filler particles. When this dispersion is cast as a film and dried, it behaves differently from a standard paint (below the critical pigment volume concentration, CPVC). In a standard paint, the low glass transition temperature (Tg) resin is plastic at room temperature and coalesced, so that the resin film fills pores and voids. A paint formulated with aluminum phosphate, however, can exhibit a different behavior. The closed pores form, as described herein, and contribute to the film hiding power.

The aluminum phosphate or aluminum polyphosphate, used as a white pigment, can replace titanium dioxide in dispersions in aqueous medium, such as polymeric latex emulsion. In one embodiment, the phosphorus:aluminum molar ratio of the aluminum phosphate is in the range of between 0.8 and 1.3. In another embodiment, the phosphorus:aluminum molar ratio of the aluminum phosphate is in the range of between 0.8 to 1.2. In one embodiment, the phosphorus:aluminum molar ratio of the aluminum phosphate is in the range of between 1.0 to 1.2.

Various paints can be formulated using the aluminum phosphate or polyphosphate made according to various embodiments herein as a pigment, alone or in combination with another pigment, such as titanium dioxide. A paint comprises one or more pigments and one or more polymers as the binder (sometimes referred to as "binding polymer"), and optionally various additives. There are water-borne paints and non-water-borne paints. Generally, a water-borne paint composition is composed of four basic components: binder, aqueous carrier, pigment(s) and additive(s). The binder is a nonvolatile resinous material that is dispersed in the aqueous carrier to form a latex. When the aqueous carrier evaporates, the binder forms a paint film that binds together the pigment particles and other non-volatile components of the water-borne paint composition. Water-borne paint compositions can be formulated according to the methods and components disclosed in U.S. Pat. No. 6,646,058, with or without modifications. The disclosure of such patent is incorporated by reference in its entirety herein. The aluminum phosphate or polyphosphate made according to various embodiments herein can be used to formulate water-borne paints as a pigment, alone or in combination with titanium dioxide.

A common paint is a latex paint which comprises a binding polymer, a hiding pigment, and optionally a thickener and other additives. Again, the aluminum phosphate or polyphosphate made according to various embodiments described herein can be used to formulate latex paints as a pigment, alone or in combination with titanium dioxide. Other components for making a latex paint are disclosed in U.S. Pat. Nos. 6,881,782 and 4,782,109, which are incorporated by reference herein in their entirety. By way of illustration, suitable components and methods for making latex paints are briefly explained below.

In some embodiments, suitable binding polymers include emulsion copolymerized ethylenically unsaturated monomers including 0.8% to 6% of fatty acid acrylate or methacrylate such as lauryl methacrylate and/or stearyl methacrylate. Based on the weight of copolymerized ethylenic monomers, the polymeric binder comprises 0.8% to 6% fatty acid methacrylate or acrylate where preferred compositions contain 1% to 5% of copolymerized fatty acid acrylate or methacrylate having an aliphatic fatty acid chain comprising between 10 and 22 carbon atoms. In one embodiment, copolymer compositions are based on copolymerized fatty acid methacrylate. In another embodiment, lauryl methacrylate and/or stearyl methacrylate are used. In one embodiment, lauryl methacrylate is the monomer of choice. Other useful fatty acid methacrylates include myristyl methacrylate, decyl methacrylate, palmitic methacrylate, oleic methacrylate, hexadecyl methacrylate, cetyl methacrylate and eicosyl methacrylate, and similar straight chain aliphatic methacrylate. Fatty acid methacrylates or acrylates typically comprise commercial fatty oils coreacted with methacrylic acid or acrylic acid to provide primarily the dominant fatty acid moiety methacrylate with minor amounts of other fatty acid acrylates or methacrylates.

Polymerizable ethylenically unsaturated monomers contain carbon-to-carbon unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, and divinyl benzene; vinyl aliphatic hydrocarbon monomers include alpha olefins such as ethylene, propylene, isobutylene, and cyclohexene as well as conjugated dienes such as 1,3-butadiene, methyl-2-butadiene, 1,3-piperylene, 2,3 dimethyl butadiene, isoprene, cyclohexane, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic monomers can include very minor amounts of acrylic acids including acrylic and methacrylic acid, ethacrylic acid, alpha-chloroacrylic acid, alpha-cyanoacrylic acid, crotonic acid, beta-acryloxy propionic acid, and beta-styryl acrylic acid.

In other embodiments, polymers useful as component (a), the "binding polymer", of the latex paints are copolymerization products of a mixture of co-monomers which comprise monomers selected from styrene, methyl styrene, vinyl, or combinations thereof. In one embodiment, co-monomers comprise at least 40 mole percent of monomers selected from styrene, methyl styrene, or combinations thereof and at least 10 mole percent of one or more monomers selected from acrylates, methacrylates, and acrylonitrile. In another embodiment, the acrylates and methacrylates contain from 4 to 16 carbon atoms such as, for example, 2-ethylhexyl acrylate and methyl methacrylates. The monomers may be used in a proportion such that the final polymer has a glass-transition temperature (Tg) greater than 21° C. and less than 95° C. In one embodiment, the polymers have a weight-average molecular weight of at least 100,000.

In one embodiment, the binding polymer comprises interpolymerized units derived from 2-ethylhexyl acrylate. In another embodiment, the binding polymer comprises polymerized units comprising from 50 to 70 mole percent of units derived from styrene, methyl styrene, or combinations thereof; from 10 to 30 mole percent of units derived from 2-ethylhexyl acrylate; and from 10 to 30 mole percent of units derived from methyl acrylate, acrylonitrile, or combinations thereof.

Illustrative examples of suitable binding polymers include a copolymer whose interpolymerized units are derived from about 49 mole percent styrene, 11 mole percent alpha-methylstyrene, 22 mole percent 2-ethylhexyl acrylate, and 18 mole percent methyl methacrylates with a Tg of approximately 45° C. (available as Neocryl XA-6037 polymer emulsion from ICI Americas, Inc., Bridgewater, N.J.); a copolymer whose interpolymerized units are derived from about 51 mole percent styrene, 12 mole percent a-methylstyrene, 17 mole percent 2-ethylhexyl acrylate, and 19 mole percent methyl methacrylates with a Tg of approximately 44° C. (available as Joncryl 537 polymer emulsion from S.C. Johnson & Sons, Racine, Wis.); and a terpolymer whose interpolymerized units are derived from about 54 mole percent styrene, 23 mole percent 2-ethylhexyl acrylate, and 23 mole percent acrylonitrile with a Tg of approximately 44° C. (available as Carboset.™ XPD-1468 polymer emulsion from B.F. Goodrich Co.). In one embodiment, the binding polymer is Joncryl.™ 537.

As described above, the aluminum phosphate or polyphosphate made according to various embodiments described herein can be used to formulate latex paints as a pigment, alone or in combination with another pigment.

Suitable additional hiding pigments include white opacifying hiding pigments and colored organic and inorganic pigments. Representative examples of suitable white opacifying hiding pigments include rutile and anatase titanium dioxides, lithopone, zinc sulfide, lead titanate, antimony oxide, zirconium oxide, barium sulfate, white lead, zinc oxide, leaded zinc oxide, and the like, and mixtures thereof. In one embodiment, white organic hiding pigment is rutile titanium dioxide. In another embodiment, the white organic hiding pigment is rutile titanium dioxide having an average particle size between about 0.2 to 0.4 microns. Examples of colored organic pigments are phthalo blue and hansa yellow. Examples of colored inorganic pigments are red iron oxide, brown oxide, ochres, and umbers.

Most known latex paints contain thickeners to modify the rheological properties of the paint to ensure good spreading, handling, and application characteristics. Suitable thickeners include a non-cellulosic thickener, in one embodiment, an associative thickener; in another embodiment, a urethane associative thickener.

Associative thickeners such as, for example, hydrophobically modified alkali swellable acrylic copolymers and hydrophobically modified urethane copolymers generally impart more Newtonian rheology to emulsion paints compared to conventional thickeners such as, for example, cellulosic thickeners. Representative examples of suitable associative thickeners include polyacrylic acids (available, for example, from Rohm & Haas Co., Philadelphia, Pa., as Acrysol RM-825 and QR-708 Rheology Modifier) and activated attapulgite (available from Engelhard, Iselin, N.J. as Attagel 40).

Latex-paint films are formed by coalescence of the binding polymer to form a binding matrix at the ambient paint application temperature to form a hard, tack-free film. Coalescing solvents aid the coalescence of the film-forming binder by lowering the film-forming temperature. The latex paints preferably contain a coalescing solvent. Representative examples of suitable coalescing solvents include 2-phenoxyethanol, diethylene glycol butyl ether, dibutyl phthalate, diethylene glycol, 2,2,4-trimethyl-1,1,3-pentanediol monoisobutyrate, and combinations thereof. In one embodiment, the coalescing solvent is diethylene glycol butyl ether (butyl carbitol)(available from Sigma-Aldrich, Milwaukee, Wis.) or 2,2,4-trimethyl-1,1,3-pentanediol monoisobutyrate (available from Eastman Chemical Co., Kingsport, Tenn., as Texanol), or combinations thereof.

Coalescing solvent is preferably utilized at a level between about 12 to 60 grams or about 40 grams of coalescing solvent per liter of latex paint or at about 20 to 30 weight percent based on the weight of the polymer solids in the paint.

The paints formulated in accordance with various embodiments provided herein can further comprise conventional materials used in paints such as, for example, plasticizer, anti-foam agent, pigment extender, pH adjuster, tinting color, and biocide. Such typical ingredients are listed, for example, in TECHNOLOGY OF PAINTS, VARNISHES AND LACQUERS, edited by C. R. Martens, R.E. Kreiger Publishing Co., p. 515 (1974).

Paints are commonly formulated with "functional extenders" to increase coverage, reduce cost, achieve durability, alter appearance, control rheology, and influence other desirable properties. Examples of functional extenders include, for example, barium sulfate, calcium carbonate, clay, gypsum, silica, and talc.

The most common functional extenders for interior flat paints are clays. Clays have a number of properties that make them desirable. Inexpensive calcined clays, for example, are useful in controlling low-shear viscosity and have a large internal surface area, which contributes to "dry hide". But, this surface area is also available to trap stains.

Because of their tendency to absorb stains, it is preferable that calcined clays are used in the paints only in the small amounts required for rheology control, for example, typically as less than about half of the total extender pigment, or are not used at all. The exemplary extenders for use in the paints described herein are calcium carbonates; that in certain embodiments, are ultra-fine ground calcium carbonates such as, for example, Opacimite (available from ECC International, Sylacauga, Ala.), Supermite (available from Imerys, Roswell, Ga.), or others having particle size of approximately 1.0 to 1.2 microns. Ultra-fine calcium carbonate help to space titanium dioxide optimally for hide (see, for example, K. A. Haagenson, "The effect of extender particle size on the hiding properties of an interior latex flat paint," American Paint & Coatings Journal, Apr. 4, 1988, pp. 89-94).

The latex paints formulated in accordance with various embodiments described herein can be prepared utilizing conventional techniques. For example, some of the paint ingredients are generally blended together under high shear to form a mixture commonly referred to as "the grind" by paint formulators. The consistency of this mixture is comparable to that of mud, which is desirable in order to efficiently disperse the ingredients with a high shear stirrer. During the preparation of the grind, high shear energy is used to break apart agglomerated pigment particles.

The ingredients not included in the grind are commonly referred to as "the letdown." The letdown is usually much less viscous than the grind, and is usually used to dilute the grind to obtain a final paint with the proper consistency. The final mixing of the grind with the letdown is typically carried out with low shear mixing.

Most polymer latexes are not shear stable, and therefore are not used as a component of the grind. Incorporation of shear unstable latexes in the grind can result in coagulation of the latex, yielding a lumpy paint with no, or little, film-forming capability. Consequently, paints are generally prepared by adding the latex polymer in the letdown. However, some paints formulated in accordance with various embodiments described herein contain latex polymers that are generally shear stable. Therefore, the latex paints can be prepared by incorporating some or all of the latex polymer into the grind. In one embodiment, at least some of the latex polymer is put in the grind.

The examples of possible forms of the process are described below. Again, one of skill in the art will recognize variants that may be utilized in performing the novel process described herein. The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLE 1

Preparation of Aluminum Phosphate Powder 791 g of phosphoric acid (81.9% wt $H_3PO_4$ or 59.3% wt $P_2O_5$) were reacted with 189 g of hydrated aluminum hydroxide (85.3% wt $Al(OH)_3$ or 58.1% wt $Al_2O_3$) in 210 g of water at 80° C. for 1h (final molar ratio P/Al=2.99) to obtain an acidic aluminum phosphate solution. In the second step, 1155 g of commercial purified sodium aluminate solution (9.7% wt Al and 11.2% wt Na or 18.3% wt $Al_2O_3$ and 15.7% wt $Na_2O$, final Na/Al=1.36) were added simultaneously with acidic aluminum phosphate solution to a stirred vessel loaded with 1500 g of water at room temperature.

The final reaction pH was 7.1 and temperature during the reaction was kept at 45° C. The resulting dispersion was centrifuged (30 min, 2500 rpm—relative centrifugal force: 1822 g) to remove the reaction liquor, forming a cake that was washed with water once (1000 g of washing water) to give a white wet cake (3300 g) with 27.0% wt non-volatiles content (902 g on dry basis following ASTM D 280) and pH 7.3. The slurry was spray-dried yielding 1090 g of aluminum phosphate powder (ca 83% wt non-volatiles content).

EXAMPLE 2

Preparation of Aluminum Phosphate Slurry 10.0 g of water were added to a 250 mL beaker. While mixing at 800 RPM (Cowles), approximately 1.34 g (1% of the non-volatiles content) of sodium polyphosphate were added. After 5 min, 150.0 g of aluminum phosphate slurry (30% non-volatiles) were added slowly (25g/min). After another 5 min, the stirrer speed was raised to 1800 RPM and 109.0 g of aluminum phosphate powder (80% non-volatiles) were added slowly (10g/min). After addition of the powder, the slurry was kept stirring at 1800 RPM for 20 min.

EXAMPLE 3

Preparation of Aluminum Phosphate Slurry 72.0 g of water were added to a 250 mL beaker. While mixing at 800 RPM (Cowles), approximately 0.96 g (1% of the non-volatiles content) of sodium polyphosphate were added. After 5 min, the stirrer speed was raised to 1800 RPM and 122.0 g of aluminum phosphate powder (80% non-volatiles) were added slowly (10g/min). After addition of the powder, the slurry was kept at 1800 RPM for 20 min.

EXAMPLE 4

Preparation of Aluminum Phosphate Slurry 72.0 g of water were added to a 250 mL beaker. While mixing at 800 RPM (Cowles), approximately 0.96 g (1% of the non-volatiles content) of sodium polyphosphate were added. After 5 min, the stirrer speed was raised to 1800 RPM and 122.0 g of aluminum phosphate powder prepared according to Example 1 at using spray-dryer (80% non-volatiles) were added slowly (10 g/min). After addition of the powder, the slurry was kept at 1800 RPM for 20 min.

EXAMPLE 5

Drying Process for the Aluminum Phosphate Slurry

A aluminum phosphate slurry containing 27% of non-volatiles content, pH equal to 7.5 and viscosity 114 cP at 129 $s^{-1}$ was feed into a spray dryer using the operating conditions:
Slurry input flow rate: 1 $L.h^{-1}$;
Blow air flow: 50 $mL.min^{-1}$;
Column heated to 120° C.; and
Nozzle breadth: 1 mm.
The final dry powder non-volatiles content was ca. 83% (ASTM D280).

RESULTS OF EXAMPLES 2-4

The non-volatiles content and viscosity at 129.1 $s^{-1}$ (24 h after preparation) of the slurries obtained are presented on Table 1.

Table 1. Non-volatiles content and viscosity at 129.1 s$^{-1}$ (24 h after preparation) of different slurries.

| Slurry prepared following | Non-Volatiles (%) | Viscosity (cPs) |
|---|---|---|
| Example 2 | 51.5 | 701 |
| Example 3 | 50.3 | 1103 |
| Example 4 | 49.5 | 660 |

The non-volatiles content were measured according to ASTM D280: The samples were dried at 110° C. for 2 h. The viscosity was measured with a Viscometer Contraves Rheotherm, shear rate at 129.1 s$^{-1}$ The 50% non-volatiles content slurry was used to formulate paint where 50% of TiO$_2$ was replaced by aluminum phosphate. Application properties of paint prepared using 50% non-volatiles content slurry are provided below:

| Description | |
|---|---|
| Hegman | 5H |
| Stormer Viscosity | 98 KU |
| PH | 9.10 |
| Opacity | 91.37% |
| Whiteness | 75.94% |
| Yellowness | 4.17% |

As mentioned, a basic titanium dioxide water-based paint is made out of a suitable latex dispersion and pigment particles. The latex particles are responsible for making a coalesced film filled with the pigmented particles, and the pigment is responsible for the film hiding power. Many additives are also used, such as: inorganic fillers, which decrease the requirements of resin and pigment; coalescing agents, that improve resin film formation; dispersants and rheological modifiers, that prevent pigment and filler caking and thus improve the paint shelf-life together with the rheological paint properties.

In a typical paint dry film, the pigment and filler particles are dispersed in the resin film. The hiding power is largely dependent on the particle refractive indices and sizes. As mentioned titanium dioxide is currently the standard white pigment because of its large refractive index and of the absence of light absorption in the visible region. A dry film of a paint formulated with the novel aluminum phosphate in some embodiments has several differences from the typical paint dry film. First, the film with the aluminum phosphate is not just a resin film. It is rather formed by enmeshed resin and aluminum phosphate. It is thus a nanocomposite film that combines two interpenetrating phases with different properties to achieve synergistic benefits, concerning film mechanical properties and resistance to water and to other aggressive agents. Second, good film hiding power is obtained at lower titanium dioxide contents, because the film contains a large amount of closed pores that scatter light. Moreover, if a titanium dioxide particle is adjacent to one of these voids, it will scatter much more than if it is fully surrounded by resin, due to the larger refractive index gradient. This creates a synergism between the novel aluminum phosphate and titanium dioxide, as far as the hiding power is concerned.

In tests comparing a standard paint dry film to a film with aluminum phosphate, a standard market formulation of a semi-matt acrylic paint was chosen and titanium dioxide was progressively replaced by the aluminum phosphate product described herein. Water content and other paint components were adjusted as required. Several of the modifications in the formula in this embodiment are related to a decreased use of thickener/rheology modifier, dispersant, acrylic resin and coalescing agent.

The preferred embodiment of the process disclosed herein has only two chemical steps from the primary raw materials and depending on the final chemical composition of the aluminum phosphate, it could be performed by only one chemical step. In certain embodiments, water consumption would be significantly reduced because this chemical route uses a small amount of process water. Also, this new chemical route does not generate effluents, or any chemical byproducts.

In addition, the product and process provided herein may also be free from corrosion problems associated with some aluminum phosphates found in the market and used in the transformation of iron oxides into iron phosphate. In addition, the non-stoichiometry together with the relative non-crystallinity (both in slurry and powder form) and the carefully controlled water content of the dry powder allow for easy swelling control that is beneficial for its performance. The nanosized particles are easily dispersed and they are stable towards settling, which allow uniform paint dispersions. Also, the nanoparticles can be strongly compatible with latex particles, by the mechanisms of capillary adhesion (in the dispersion drying stage) followed by ion-cluster mediated electrostatic adhesion (in the dry film)—bicontinuous networks may be formed, in many cases. Finally, the product is also strongly compatible with many other particulate solids commonly used as paint fillers, such as the various silicates, carbonates and oxides found in formulated water-based dispersions, which may contribute to the cohesion and strength of the paint dry film.

In certain embodiments, the advantage of this chemical route include, the reduction of raw materials, the use of commodities, the reduction of chemical steps, and elimination of effluents and wastes, the elimination of the aluminum sulfate byproduct, reduction of waste water treatment, the potential elimination of the solid-liquid separation, and the elimination of washing the solid.

In addition, the reaction in the second chemical step and the dispersion step (slurry formation) could be performed in only one process unit, with the possibility to adjust the particle size distribution in the reactor during the formation of the aluminum-phosphate by controlling the shear stress of the reactants during the precipitation, to get directly the final aluminum phosphate slurry.

Also, the composition of the suspension to the spray drying process could be adjusted directly from the reactor to obtain the specified viscosity, particle size distribution and fast re-dissolution powder.

As demonstrated above, embodiments described herein provide a method of making amorphous aluminum phosphate. Also provided is an aluminum phosphate slurry comprising about 20-60% non-volatiles. While the subject matter has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the resins or pigments is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A process for making a chemical composition useful as a coating composition comprising amorphous aluminum phosphate particles disposed in a liquid binding polymer matrix, the process comprising the steps of:
    combining acidic aluminum phosphate in solution or dispersion form with a sodium aluminate solution to form amorphous aluminum phosphate particles;
    drying the particles, wherein the particles are substantially free of open pores and have a macropore volume substantially less than 0.1 cc/gram; and
    combining the particles with a liquid binding polymer to form the chemical composition, wherein the chemical composition comprises a dispersion of the particles within the binding polymer, and wherein when used as a coating composition and applied onto a substrate the chemical composition dries to form film comprising the dispersion of amorphous aluminum phosphate particles.

2. The process as recited in claim 1 wherein the sodium aluminate is added to neutralize the acidic aluminum phosphate.

3. The process as recited in claim 1 wherein the acidic aluminum phosphate has a pH of 6 or less.

4. The process as recited in claim 1 wherein the sodium aluminate has a pH of 10 or more.

5. The process as recited in claim 1 wherein the acidic aluminum phosphate is prepared by combining phosphoric acid with aluminum hydroxide.

6. The process as recited in claim 1 wherein during the step of combining the acidic aluminum phosphate in solution or dispersion form with the sodium aluminate solution an aluminum hydroxide is added.

7. A method of making a coating composition comprising amorphous aluminum phosphate particles uniformly dispersed therein comprising the steps of:
    combining phosphoric acid with aluminum hydroxide and sodium aluminate to form a dispersion of amorphous aluminum phosphate particles;
    separating and drying the amorphous aluminum phosphate particles, wherein the particles have a macropore volume substantially less than 0.1 cc/gram; and
    combining the particles with a binding polymer to form the coating composition.

8. The method as recited in claim 7 wherein the amorphous aluminum phosphate particles comprises closed voids.

9. The method as recited in claim 7, wherein such particles are substantially free of open pores.

10. A method for making a coating composition comprising amorphous aluminum phosphate particles dispersed within a binding polymer matrix, the method comprising the steps of:
    combining phosphoric acid with aluminum hydroxide to form an acidic aqueous aluminum phosphate solution or dispersion;
    combining the acidic aluminum phosphate solution or dispersion with a neutralizing agent having a pH that is greater than the acidic aluminum phosphate to precipitate amorphous aluminum phosphate particles;
    drying the particles, wherein the particles have a macropore volume substantially less than 0.1 cc/gram; and
    combining the particles with a water-borne or non-water-borne binding polymer to form the coating composition, wherein when applied to a substrate and allowed to dry the coating composition forms a film comprising the amorphous aluminum phosphate particles.

11. The method as recited in claim 10 wherein the particles are substantially free of open pores.

* * * * *